Patented Nov. 1, 1938

2,135,427

UNITED STATES PATENT OFFICE 2,135,427

TREATMENT OF STILL RESIDUE

Frank W. Corkery, Crafton, Pa., assignor to Pennsylvania Industrial Chemical Corporation, a corporation of Pennsylvania No Drawing. Application January 12, 1937,
Serial No. 120,192

4 Claims. (Cl. 196—13)

This invention relates to the purifying treatment of still residues of a particular sort, and to the further treatment of such still residues to produce a primarily elastic mass particularly suitable for use in linoleum, mastic tile, and the like products. This constitutes a continuation in part of my copending application Serial No. 88,591, filed July 2, 1936, and also bears a species relationship to the invention generically disclosed and claimed in my co-pending application Serial No. 53,213, filed December 6, 1935.

The still residue with which I deal is a still residue remaining from the treatment of coke-oven light oil. This still residue contains polymers of resin-forming bodies in various stages of polymerization, heavy monomers, naphthalene, and varying percentages of solvents and sulphonates. It is a dark, viscous, oily substance, deficient in drying qualities, and of itself possessing but little utility in the arts. As it is commercially available, the still residue may be obtained from either of the following operations conducted upon the light oil derived from the gases which are evolved in the coking distillation of coal.

One such source is the still in which coke-oven light oil is purified and fractionated to give crude benzol, crude toluol, No. 1 crude solvent naphtha (crude xylol), and No. 2 crude solvent naphtha. The residuum from this fractionation consists largely of heat polymers, and is known in the trade as "crude still" residue. The fractions from the "crude still," after washing with sulphuric acid and neutralization, are distilled in what are known in the trade as "pure stills." The residues from the distillation of these fractions comprise primarily acid polymers and heat polymers, and comprise also sulphonates. It also contains sulphates from acid purification and neutralization which have not been wholly removed by washing. This "pure still" residue normally is mixed in a residue tank with the "crude still" residue, so that as commercially available still residue contains at least the residual products from these two types of still dealing with coke-oven light oil and its fractions.

Usually there is also mixed in with these two still residues in the residue tank a third residue which comprises bottoms from the distillation of the heavier cuts of No. 1 and No. 2 crude solvent naphtha. Usually the still residue mixture is subjected to a distillation for the removal of solvents and naphthalene. As commercially available, however, the still residue yet contains a small indeterminate percentage of solvents and naphthalene. Although there is variation in the above-noted practice in different coking plants, commercial still residue usually consists of 70 to 75% crude still residue, or crude still residue and bottoms, and 25 to 30% pure still residue.

In preparation for an oxidizing treatment, or in preparation for other uses of the still residue, I desirably remove sulphonates. This sulphonate removal I effect by commingling the still residue with a petroleum distillate, such as petroleum naphtha, mineral spirits, kerosene, ligroin, gasoline, and the like, in which sulphates and sulphonates are relatively insoluble. The sulphates and sulphonates may be considered in practical effect wholly insoluble in these petroleum distillates at temperatures not exceeding 80° F., and I therefore preferably maintain the solvent mixture at or below such temperature. The use of any substantial quantity of any one of the petroleum distillates is useful in the removal of sulphates and sulphonates, but I prefer to utilize a volume of petroleum distillate almost double the volume of the still residue, and prefer to use petroleum naphtha, which has the least solvent power for sulphates and sulphonates. In the admixture, the other components of the still residue are soluble in the petroleum distillate, but upon standing the sulphates and sulphonates settle out. Physical separation of the still residue solution and the sulphate and sulphonate precipitate may be effected in any suitable manner, as, for instance, by decantation or by filtration. Desirably, the solution, after separation of the precipitate, is agitated with a small quantity of sodium hypochlorite, followed by a sodium hydroxide wash and water washing, this latter treatment having the effect of improving the odor of the still residue.

I may then desirably introduce into the solution bleaching clay of any of the well-known sorts, desirably in a weight of from 2 to 5% the weight of the solution, agitate it in the solution, and filter it out. The clay, as filtered from the solution, takes with it some of the color-forming bodies of the still residue, leaving the solution improved in color as well as odor, and containing a lessened content of impurities. Following such of these purification steps as are employed, I separate the petroleum distillate solvent and the still residue by distilling off the petroleum solvent either under vacuum or by straight distillation.

Preponderantly, sulphates and sulphonates are found in the pure still residue, so their presence in the commercial still residue follows roughly the percentage of pure still residue to crude still residue, or crude still residue to bottoms, comprised in what is obtainable under the simple designation of still residue, that is, still residue derived from light oil from the gases obtained during the coke-oven distillation of coal. For the following treatment we shall therefore consider a still residue containing no substantial content of sulphates and sulphonates to be our starting material, whether they be removed in some manner, such as by the process above described, or whether they be initially present in negligible proportion.

Purification changes the character of the normal commercial still residue in several particulars. By purification the color of the still residue is changed from a dull, dark red to a bright, yellowish red. The purified product lacks the sweetish odor associated with unpurified still residue, while retaining the characteristic coal-tar odor and the burnt odor typical of still residue. The voscosity of purified still residue is much lower than that of a still residue before purification. As typical, I have noted a lessening in viscosity from 180 Saybolt seconds at 100° C. to a viscosity of 100 Saybolt seconds at 100° C. The purified still residue is miscible with most organic liquids, including the petroleum distillates without precipitation or sludge formation. Another important improvement in purified still residue over the unpurified material is found after oxidation, in that the purified material, as oxidized, is far more soluble than the oxidized unpurified material. By purifying the still residue I therefore not only place it in better condition for use as a raw still residue, but as a matter of greater importance I prepare it for the production of an oxidized product of improved solubility.

Whereas for many uses it is advantageous to retain and to oxidize substantially the entire initial content of the still residue (sulphates, sulphonates, and the like, being considered as wholly foreign bodies), for other purposes advantage is derived by removing a portion of the lower oily polymers of the still residue prior to oxidation. If this topping operation by which a portion of the lower oily still residue polymers are removed is conducted in situ following the process of purification, the removal of a portion of the lower polymer oils may follow sequentially the step of distilling off the mineral spirits used in purifying the still residue, and a continued distilaton which removes the initial solvent content, and naphthalene content of the still residue. Conducting such distillation to remove the oily lower boiling end of the still residue, that part of the distillation which is conducted at a temperature at and above 425° F. is desirably conducted under vacuum and with the use of live steam. If the still residue is purified at another time or place, or if purification of the still residue be dispensed with, the distillation to remove a portion of the oily lower boiling end of the still residue is similarly conducted; distillation being continued until the desired proportion of oily lower boiling end of the still residue has been distilled over, the distillation at and above 425° F. being desirably conducted under vacuum and in the presence of live steam.

In preparation for use as a raw material, any desired portion of the oily lower boiling end of the still residue may be distilled off. In preparation for oxidation, I desirably remove from 25% to 75% of the oily lower boiling end of the still residue, as such oily lower boiling end exists after the removal of naphthalene and aromatics of the solvent grade. This oily, lower boiling, end of the still residue consists of the aromatic oils boiling up to about from 275° C. to 290° C., and an oily substance formed of the dimers of the resin-forming bodies (such as coumarone and indene) in the still residue, which boils from about 300° C. to about 360° C. It is this oily end of the still residue which possesses relatively high unsaturation, and which is, therefore, particularly susceptible to oxidation. As a precedent to an effective oxidizing treatment, it is necessary that some substantial proportion of the oily lower boiling end of the still residue be retained, as that portion of the still residue which is formed of higher polymers possesses but relatively slight unsaturation, and material advantage is not to be derived by attempted oxidation of it.

I have discovered that for certain purposes, and chiefly for use in linoleum and mastic tile, a lesser elasticity than that obtained by oxidizing the total content of the still residue (disregarding foreign bodies, such as sulphonates, naphthalene, and solvents) is desirable. When the entire true content of the still residue is oxidized into the state of a solid up to a desired melting-point it has high penetration and elasticity. As an example, when the total true still residue is oxidized to a melting-point of 180° F., it acquires a penetration of approximately 140 at 77° F. under a 50 gram load. As forming the body of tile of linoleum it then lacks firmness sufficient to support loads without yielding to a material extent. It is susceptible to penetration under concentrated forces, such as the feet of articles of furniture at which a substantial weight load is concentrated. For this purpose, therefore, I have found it desirable to remove a proportion of the oily lower end of the still residue to provide, upon adequate oxidation, a solid material of adequately high melting-point and of moderate penetration and elasticity, so that as incorporated in tile or linoleum it may have adequate weight-supporting firmness. As an example, the still residue, with about 70% of its oily lower boiling end removed, when oxidized to a melting-point of 180° F., acquires a penetration of only about 30 to 35 at 77° F. under a 50 gram load. In preparation for oxidation in contemplation of such use, the extent to which the still residue is topped will depend upon the type of tile or linoleum which is to be made from the oxidized product; that is, in accordance with the load-carrying firmness which may be necessary for it in its contemplated use and to the climate in which the linoleum or tile is to be used.

Oxidation of the topped still residue may be conducted in accordance with the disclosure of my co-pending application Serial No. 53,213, filed December 6, 1935. Such procedure will be here summarized. The liquid topped still residue is introduced into a vessel provided with coils for circulating steam, or other heating medium, and provided with perforated coils connected with a blower for introducing air under pressure. Desirably, the still residue is initially heated to a temperature approximating 175° F., in order to increase the fluidity of the material, and in order to facilitate the dispersion of air through it. Air is then introduced in finely divided streams adjacent the bottom of the vessel, and is passed upwardly through the body of the still residue. In so doing I introduce the air under such pressure that it is capable, in a dispersed condition, of penetrating the body of the liquid.

Blowing is continued for a total treating period of from 2 to 5 days in accordance with the proper consistency or melting-point of the product for its ultimate intended use. Thus for mastic tile and linoleum 3 to 4 days, giving a melting-point of around 120° F., is desirable. For use as an adhesive, less than 3 days is desirable, while for use in making molded articles, and for tile and linoleum of grades adapted for heavy duty, a treatment of more than 4 days to impart a melting-point of 150° F. and over is useful.

Throughout the blowing the temperature of the still residue is progressively raised, as it becomes possible so to do without blowing off content of the still residue which it is desired to retain, and as it becomes necessary to do so in order to maintain the still residue sufficiently liquid for the dispersion of air therethrough. In usual procedure the working temperature at which the still residue is blown is not carried upwardly beyond about 325° F.

With blowing carried to any stage the result of the blowing is an oxidation of the unsaturates of the still residue, giving it drying qualities and increased viscosity. As compared with oxidized unpurified still residue, the product obtained as herein described is characterized, as above noted, by increased solubility. Comparing the topped and oxidized still residue with oxidized untopped still residue, the characteristics of decreased elasticity and penetration are the typical result of the topping. The topped and oxidized product may be considered to occupy in respect to these qualities a position intermediate that of the oxidized untopped still residue and hard resinous material obtainable by distilling off all the lower polymers of the still residue, as well as the initial naphthalene and solvent content of the still residue. Its penetration and elasticity are substantially greater than the like qualities of a true resin, although less than those of untopped oxidized still residue.

Considering the purified and topped, but unoxidized, still residue, this is a homogeneous material, free from curds. Its waterproofing qualities are improved. It is soluble in ordinary petroleum solvents, without the formation of sludge. Its viscosity, or melting-point, depends upon the stage to which topping is carried. It lacks the elasticity which is the typical characteristic of my oxidized still residue, but is useful for many of the purposes for which a resin is commonly employed.

I claim as my invention:

1. The herein described method of oxidizing aromatic still residue from the treatment of coke-oven light oil containing the sulphonates of aromatics resultant from acid purification of the light oil to produce a gummy mass of high purity and having a lesser elasticity than that resultant from oxidation of the total still residue content which comprises precipitating sulphonates in the still residue by solvent separation in a low aliphatic hydrocarbon solvent, separating out the precipitate, by distillation separating from the still residue the aliphatic hydrocarbon solvent and the more volatile content of the still residue such as naphthalene and aromatic solvent content, by continued distillation removing a portion and less than all of the oily lower polymers contained in the still residue, and oxidizing the still residue so prepared by oxygen dispersion through the still residue continued to a stage at which the still residue is solid at temperatures at least as elevated as normal room temperature while supplying thereto heat adequate to maintain it at a progressively increased liquefying temperature.

2. The herein described method of purifying raw aromatic still residue from the treatment of coke-oven light oil derived in the by-product coking of coal and containing sulphonates of the light oil aromatics formed by acid purification and neutralization in the light oil prior to a distillation of the lght oil, comprising a solvent separation and sulphonate precipitation by mixing and settling the raw still residue with approximately twice its volume of low-boiling aliphatic solvent, separating the precipitated sulphonates from the solution of sulphonate-freed still residue in low-boiling aliphatic solvent, and by distillation separating the solvent from the still residue.

3. The herein described method of purifying raw aromatic still residue from the treatment of coke-oven light oil derived in the by-product coking of coal and containing sulphonates of the light oil aromatics formed by acid purification and neutralization in the light oil prior to a distillation of the light oil, comprising a solvent separation and sulphonate precipitation by mixing and settling the raw still residue with at least an equal volume of low-boiling aliphatic solvent, separating the precipitated sulphonates from the solution of sulphonate-freed still residue in low-boiling aliphatic solvent, and by distillation separating the solvent from the still residue.

4. The herein described method of purifying raw aromatic still residue from the treatment of coke-oven light oil derived in the by-product coking of coal and containing sulphonates of the light oil aromatics formed by acid purification and neutralization in the light oil prior to a distillation of the light oil, comprising a solvent separation and sulphonate precipitation by mixing and settling the raw still residue with at least an equal volume of low-boiling aliphatic solvent, by distillation separating from the still residue the aliphatic hydrocarbon solvent and the more volatile content of the still residue such as naphthalene and aromatic sclvent content, and by continued distillation removing a portion and less than all of the oily lower polymers contained in the still residue.

FRANK W. CORKERY.